US006244457B1

United States Patent
Piotrowski et al.

(10) Patent No.: US 6,244,457 B1
(45) Date of Patent: *Jun. 12, 2001

(54) GAUGE HATCH WITH DIAPHRAGM AND LIQUID SEAL

(75) Inventors: Thomas C. Piotrowski, West Chicago, IL (US); Martin Clift, Vacaville, CA (US)

(73) Assignee: The Protectoseal Company, Bensenville, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,570

(22) Filed: Nov. 26, 1997

Related U.S. Application Data

(63) Continuation-in-part of application No. 08/968,609, filed on Nov. 13, 1997, now Pat. No. 6,056,005.

(51) Int. Cl.⁷ .................................................. B65D 45/28
(52) U.S. Cl. .......................... 220/314; 220/228; 220/263; 220/203.03; 220/820; 220/843; 220/844; 220/378
(58) Field of Search ..................................... 220/314, 810, 220/820, 843, 844, 228, 262, 263, 203.01, 203.03, 378

(56) References Cited

U.S. PATENT DOCUMENTS

| 1,506,610 | * | 8/1924 | Booth ................................... 220/228 |
| 1,554,773 | * | 9/1925 | Wiggins ............................... 220/228 |
| 1,585,512 | * | 5/1926 | Roades ............................. 220/203.03 |
| 1,651,051 | | 11/1927 | Wiggins . |
| 1,716,950 | * | 6/1929 | Day ................................. 220/228 X |
| 1,754,091 | * | 4/1930 | Friedman ............................. 220/228 |
| 1,874,727 | * | 8/1932 | Wiggins et al. ................. 220/228 X |
| 1,874,742 | * | 8/1932 | Harnsberger ......................... 220/228 |
| 2,367,158 | | 1/1945 | Ulm . |
| 2,384,147 | | 9/1945 | Wiggins . |
| 2,406,521 | * | 8/1946 | Wiggins ............................... 220/228 |
| 2,541,862 | * | 2/1951 | Cunningham .................... 220/228 X |
| 2,575,574 | | 11/1951 | Withrow et al. . |
| 2,929,335 | | 3/1960 | Seiler . |

(List continued on next page.)

Primary Examiner—Allan N. Shoap
Assistant Examiner—Robin Hylton
(74) Attorney, Agent, or Firm—Olson & Hierl, Ltd,

(57) ABSTRACT

A gauge hatch has a cover structure that incorporates a pallet/diaphragm combination and that is cooperatively associated with a pressure responsive liquid seal subassembly. The gauge hatch also incorporates a vent neck and a radially adjacent wall that defines with the vent neck a circumferentially extending reservoir. An exterior preferably radially extending arm permits the cover structure to be opened and inclined at an angle relative to the vent neck. Optionally, the cover may be kept in a closed position. The diaphragm normally seats upon the vent neck. A sealing liquid in the reservoir has a closed chamber over the reservoir liquid. When the arm is not held in a cover closed position, and up until a set vent neck pressure is reached, the liquid seal subassembly eliminates low level fugitive vapor emissions escaping from the diaphragm/seat region. The liquid seal subassembly opens when (a) a pressure in the vent neck occurs which exceeds the predetermined set point opening pressure of the cover structure; (b) a pressure in the closed chamber exceeds the predeterminable maximum liquid seal pressure, or (c) the cover structure is manually opened.

15 Claims, 6 Drawing Sheets

U.S. PATENT DOCUMENTS

| | | |
|---|---|---|
| 3,116,767 * | 1/1964 | Blin et al. .................. 220/228 X |
| 3,394,732 | 7/1968 | Lisciani . |
| 4,326,556 | 4/1982 | Deutsch et al. . |
| 4,502,500 | 3/1985 | Upton . |
| 4,724,857 | 2/1988 | Taylor . |
| 4,773,441 | 9/1988 | Biba . |
| 4,787,409 | 11/1988 | Taylor . |
| 4,977,918 | 12/1990 | Taylor . |
| 5,116,089 | 5/1992 | Taylor . |
| 5,273,065 | 12/1993 | Taylor . |

* cited by examiner

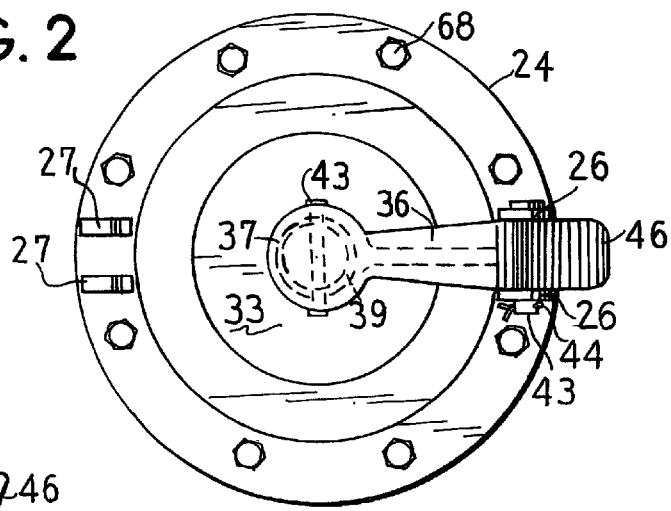
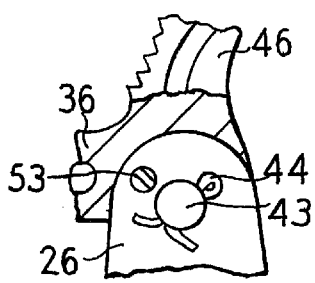
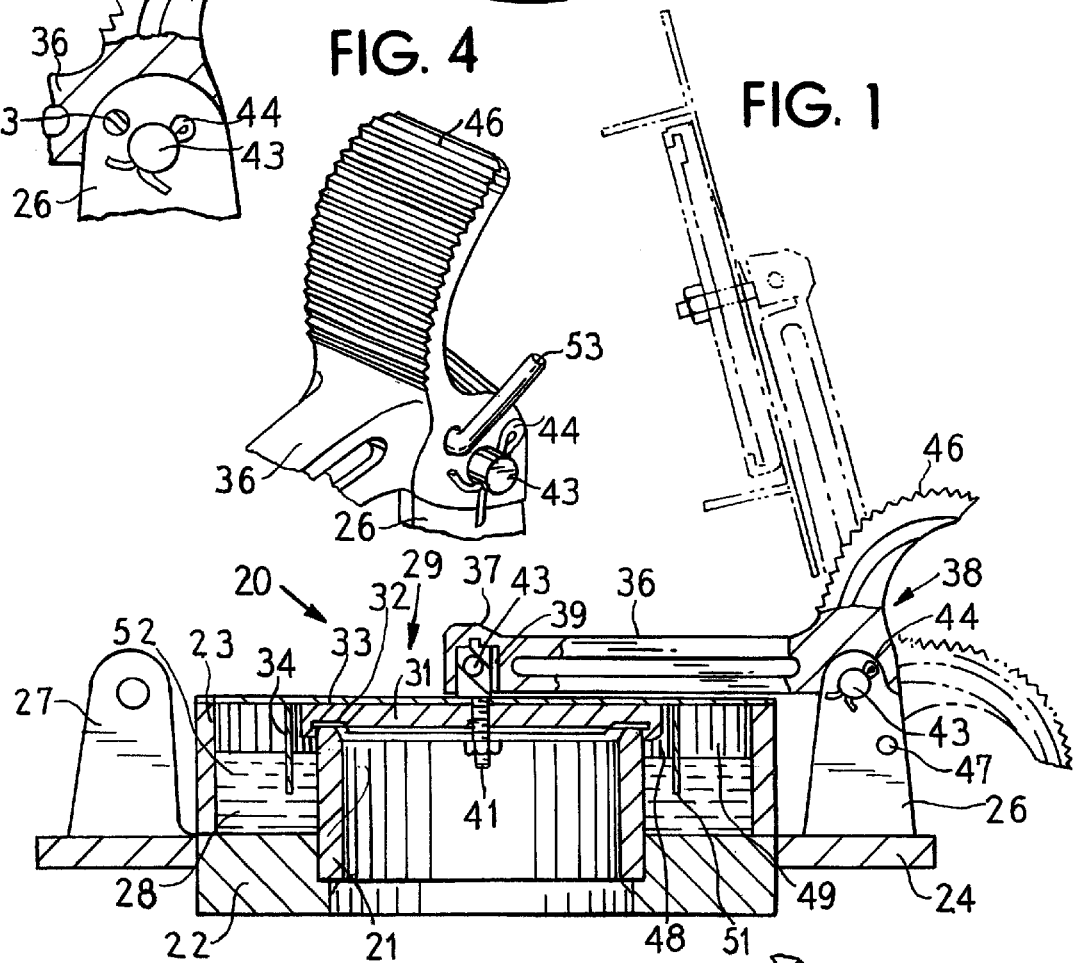
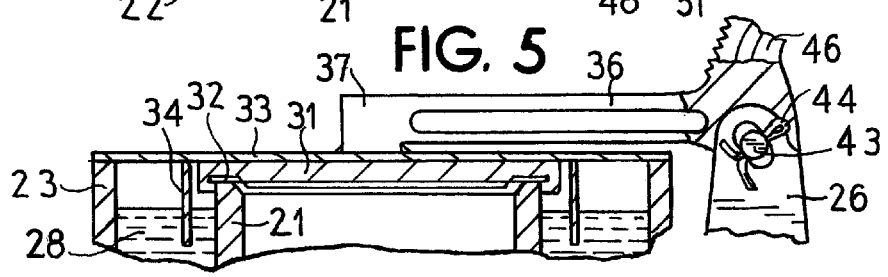

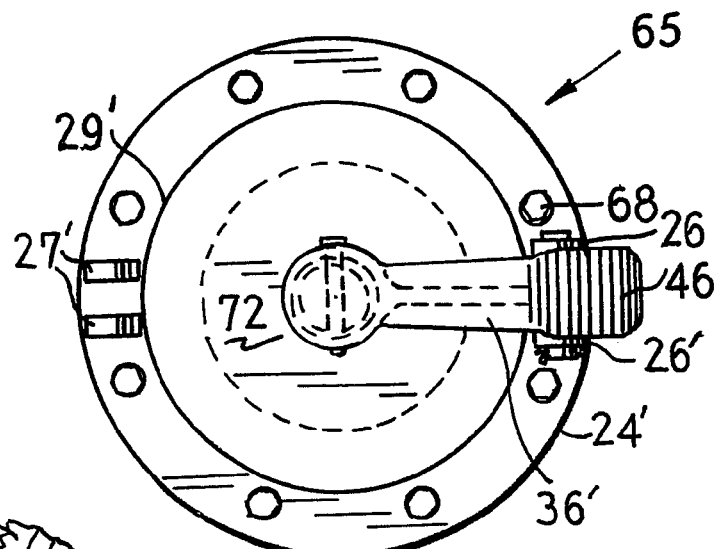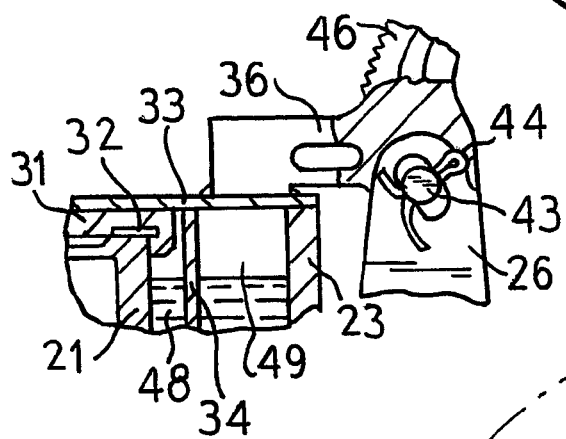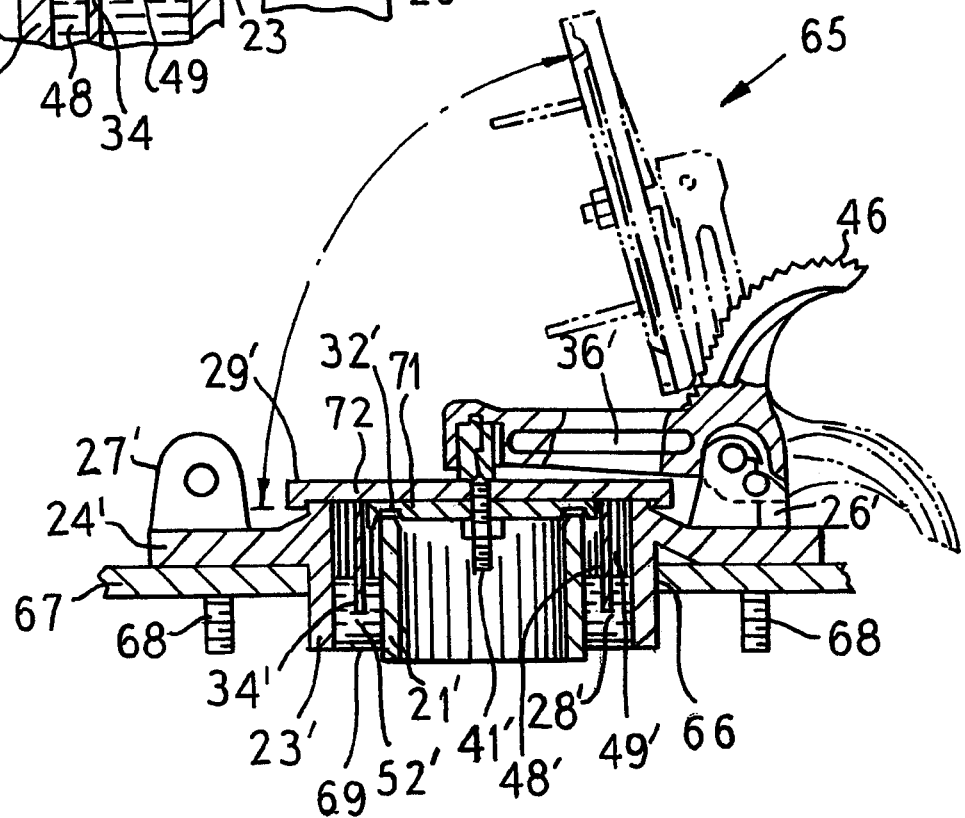

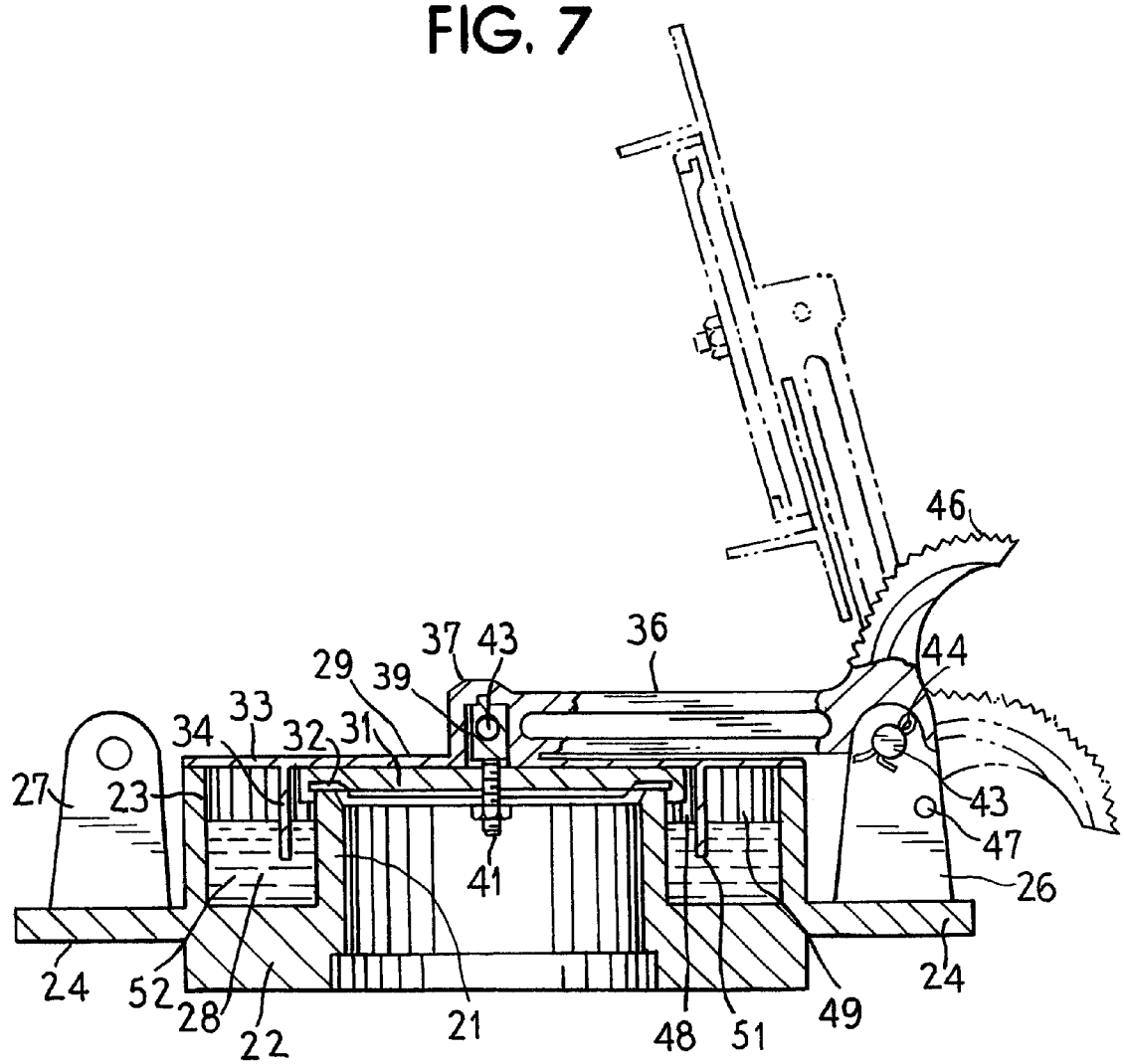
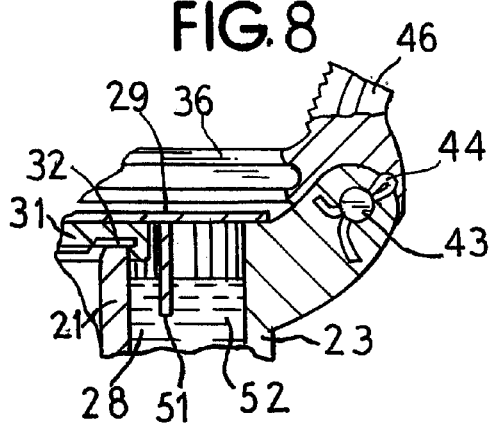

GAUGE HATCH WITH DIAPHRAGM AND LIQUID SEAL

RELATED APPLICATION

This application is a continuation-in-part of U.S. Ser. No. 08/968,609, filed Nov. 13, 1997, now U.S. Pat. No. 6,056,005, issued May 2, 2000.

FIELD OF THE INVENTION

This invention relates to gauge hatches which reduce low level fugitive vapor emissions prior to opening.

BACKGROUND OF THE INVENTION

At least one opening or vent is commonly provided in a tank (such as a reactor, a processing device, a storage tank, a gas holder or other vessel) for the discharge, or the release, of an undesirably large pressure differential relative to the adjacent environment. To regulate use or operation of the tank, avoid material loss from the tank, prevent damage to the tank, and/or minimize or even prevent environmental contamination with material from the tank, such a vent is commonly provided with a vent closure that can open at a preset pressure differential.

While various vent closure structures are known, one particularly effective structure utilizes a combination of pallet and diaphragm. The pallet in normal valve operation extends across and closes the vent mouth while the associated diaphragm seats about and seals the vent mouth. The pallet and diaphragm combination can be considered to comprise or to be included in a vent closure cover subassembly.

One commonly used type of vent closure structure that incorporates a pallet and diaphragm combination is a gauge hatch. Characteristically, a conventional gauge hatch has a radially extending pivot arm that is associated with an exterior central portion of the closure cover subassembly and that is pivotably associated with an exterior cover-adjacent hitching or pivot post. Thus, this pivot arm permits the normally closed cover subassembly to be pivoted to a vent open position where the cover assembly and pivot arm do not interfere with tank interior access for tank measurements that are made through a vent by an operator. The cover subassembly in a gauge hatch thus can be assembled so as to be either opened manually by the operator, or opened automatically if the associated tank reaches a set pressure where pressure in the tank needs to be relieved.

Various means are known for regulating the opening or set pressure in a gauge hatch-equipped vent where, at vent opening, the pallet and diaphragm combination separate from the valve mouth. For example, one particularly effective pressure regulating means comprises a weight that is inherently associated with, or that is effectively loaded onto the upper outside surface of the cover. Thus, in such an arrangement, the weight-loaded pallet and diaphragm combination of a cover separates from its associated seated configuration at a preset tank pressure (which can be super-atmospheric), thereby to achieve vent closure opening.

Some gauge hatches are provided with retainer means for optionally holding the closure cover subassembly in a "bolted down" or equivalent vent closed configuration. The use of the retainer means can be an operator-selected option. Such a gauge hatch is typically utilized for association with a tank that is also equipped with a vent valve which automatically opens when the associated tank reaches a set pressure.

One problem with such a pallet and diaphragm-type gauge hatch is that a small volume of fugitive vapor emissions (typically parts per million) may occur between the diaphragm and its seat before either the set opening pressure of the gauge hatch cover is reached or the gauge hatch cover is manually opened by an operator.

The present invention overcomes this fugitive emissions problem for pallet and diaphragm type gauge hatch vent closures by incorporating into the gauge hatch structure a cooperating liquid seal. The liquid seal can function to virtually eliminate the escape of all fugitive vapor emissions prior to the opening of the pallet and diaphragm combination either at a set opening pressure or at manual opening.

SUMMARY OF THE INVENTION

More particularly, this invention relates to a gauge hatch structure for a tank vent or the like comprising an integrated combination of (a) a normally pressure responsive vent closure cover means that incorporates a pallet means with (b) a pressure-responsive liquid seal.

The inventive gauge hatch structure incorporates a cover subassembly, a cooperating vent neck and wall means that along with the neck define a reservoir. In the cover subassembly, the pallet means normally closes the neck upper end. Preferably the pallet means in the cover assembly is also associated with a diaphragm that is normally seated at the vent neck upper end portion. A flange-type mounting means for associating the gauge hatch with a tank or the like is also incorporated. Depending upon the arrangement of the components employed in a particular embodiment of the gauge hatch structure, the inventive gauge hatch structure can be used either for relief of pressure in a tank holding super-atmospheric pressures, or as a manually operable vent port for use in tank measurements or the like. (The term "manually" or equivalent is used in a generic sense to indicate operation by a user or operator using a hand or a foot.)

The gauge hatch cover subassembly and the liquid seal subassembly operate cooperatively. The combination functions so that the liquid seal subassembly can eliminate the escape into the environment of low level fugitive vapor emissions past the pallet and also the diaphragm seat (if present) prior to the gauge valve cover subassembly opening either at a set pressure or manually.

In addition, the inventive gauge hatch structure includes an arm means that preferably radially extends across at least a portion of the closure cover. A proximal portion of this arm means is preferably located at a central outside top portion of the cover means and fastening means interconnects these respective portions. A distal portion of this arm means is preferably located along the outside perimeter of the cover means where pivotal connecting means is provided. Thus, in the vent open configuration, the cover means can be pivoted upwardly and away from the vent neck upper end portion so as to be generally and preferably inclined relative thereto.

The arm means, the fastening means and the pivotal connecting means can have various structures. For example, the arm means can include an optional extension that extends from the cover central portion to an opposite side position (relative to the distal pivotal portion). In addition, retainer means can optionally be provided for operator-selected usage in holding the gauge valve cover means in a closed position with the pallet and the diaphragm (if present) seated and sealed upon the vent neck upper end portion.

Either the inherent weight of the closure cover means, or the effective auxiliary equivalent weight exteriorly applied to the closure cover means in combination with the inherent weight of the closure cover means, determines the set point opening pressure of the cover means even when the retainer means is present but is not operative or functional.

To facilitate manual opening and closing of the cover means, the arm means can include, if desired, auxiliary member means, such as an upstanding foot treadle or the like, to facilitate the manual opening and closing of the cover means by an operator.

In the inventive gauge hatch, the liquid seal subassembly includes a sealing liquid reservoir with a normally closed chamber that is located over a portion of the surface of a sealing liquid in the reservoir and that is radially adjacent to the vent neck. A side wall region of the closed chamber is defined by a baffle or apron that circumferentially extends around the vent neck and that is suspended preferably vertically from the pallet means. The apron extends down into the reservoir and has a lower end region that normally terminates below the surface of the sealing liquid in the reservoir.

When the inventive gauge hatch structure is adapted for use with a tank holding superatmospheric pressures, the reservoir is preferably circumferentially positioned about the outside of the vent neck, and any small volume of fugitive vapor emissions that leaks past the contact seal existing at the normally closed seat between the vent neck and the pallet (and, if present, also the diaphragm) enters the closed chamber. The liquid seal between the reservoir liquid and the apron lower end region does not allow vapor emissions that enter the closed chamber to escape and reach the atmosphere (that is, the environment).

The opening of the pallet and associated diaphragm at a set point pressure is independent in operation from the opening of the liquid seal. If and when the leakage of fugitive vapor emissions increases (perhaps caused by tank pressure increase), the pressure in the closed chamber increases. The increase causes the reservoir liquid in the closed chamber to be displaced downwardly and to move into an adjacent reservoir region, but the seal is maintained. Eventually the pressure can increase to a level which is in excess of the maximum displacable liquid head in the closed chamber. This level defines the maximum liquid seal pressure of the closed chamber.

In the inventive gauge hatch structure, the cover means preferably incorporates a combination of diaphragm and associated pallet. The cover means preferably lifts (that is, opens and separates) from the neck-associated seating surface at a set point pressure which is preferably at or below the maximum liquid seal holding pressure. Preferably, the inventive gauge hatch structure is leak-free until the cover means lifts from the seat at the neck either at a set point or manually.

The inventive gauge hatch structure can optionally be associated with various auxiliary subassemblies, such as a constant level sealing liquid supply source, and/or a signaling device (which preferably can be remotely sensed).

The set pressure opening of the cover subassembly is based upon the tank pressures applied to the cover structure. When such opening occurs, the apron is separated from the reservoir sealing liquid and tank pressure is vented to the atmosphere.

Various features of the inventive gauge hatch structure are discussed and disclosed in the following description.

Other features, objects, advantages, aims, embodiments, applications and the like will be apparent to those skilled in the art from the present description taken with the accompanying drawings and the appended claims.

BRIEF DESCRIPTION OF THE DRAWINGS

In the drawings:

FIG. 1 is an axial and diametrical cross-sectional view taken through one embodiment of a gauge hatch structure of the invention that is adapted for use at superatmospheric pressure;

FIG. 2 is a top plan view of the FIG. 1 gauge hatch;

FIG. 3 is a fragmentary view similar to a portion 1 of FIG. 1, but showing an alternative embodiment of a gauge hatch structure of the invention;

FIG. 4 is a fragmentary perspective view of the embodiment of FIG. 3;

FIG. 5 is a fragmentary view similar to a portion of FIG. 1, but showing a further alternative embodiment of a gauge hatch structure of the invention;

FIG. 6 is a fragmentary view similar to a portion of FIG. 1, but showing a further alternative embodiment of a gauge hatch structure of the invention;

FIG. 7 is a view similar to FIG. 1, but showing a further alternative embodiment of a gauge hatch structure of the invention;

FIG. 8 is a fragmentary view similar to a portion of FIG. 8, but showing an alternative embodiment of a gauge hatch structure of the invention;

FIG. 9 is a view similar to FIG. 1, but showing an alternative embodiment of a gauge hatch structure of the invention that is in association with a (fragmentarily shown) tank;

FIG. 10 is a top plan view of the FIG. 9 gauge hatch;

DETAILED DESCRIPTION

Figure 15:
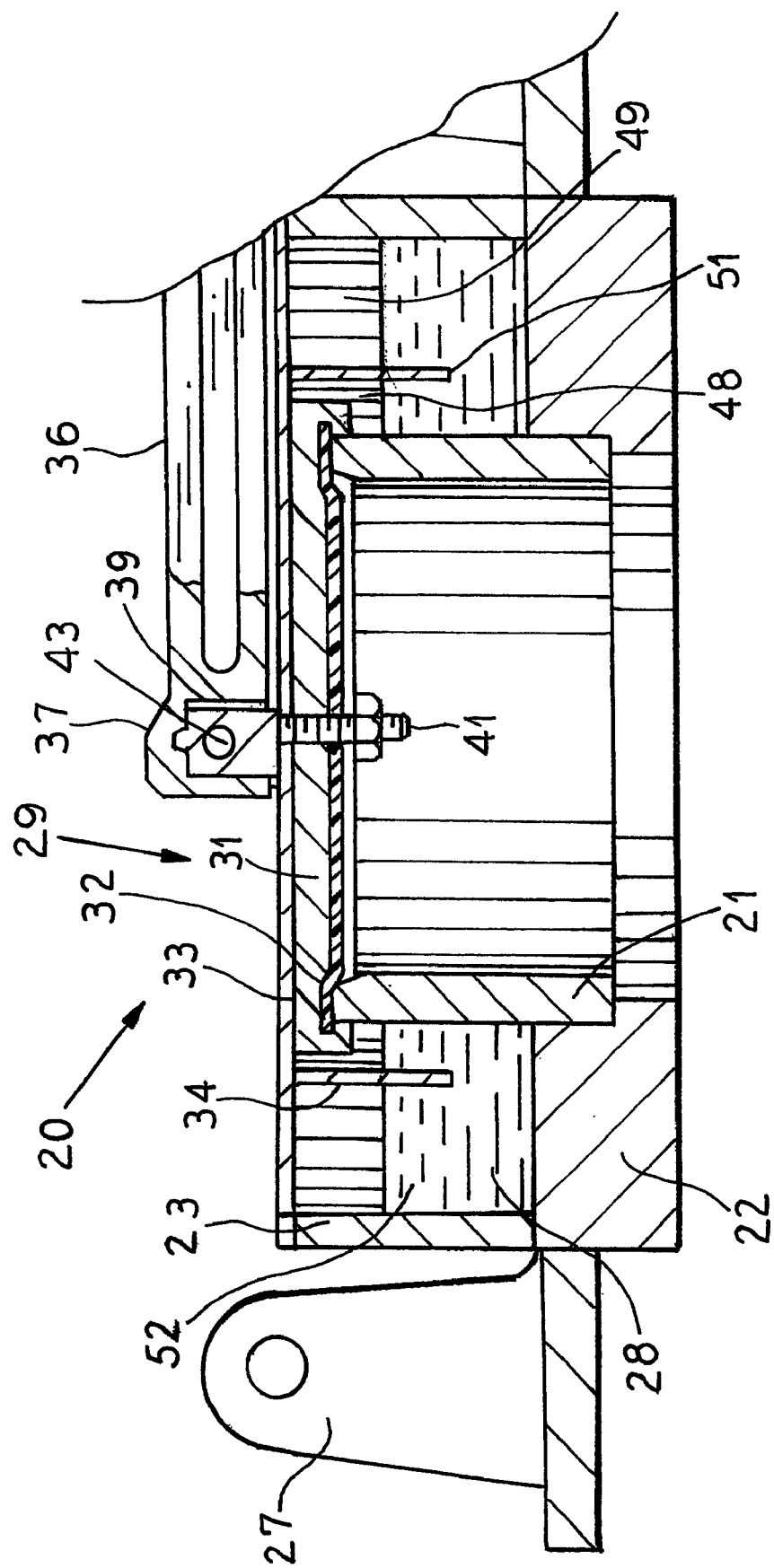
FIG. 15 is an enlarged fragmentary view similar to FIG. 1 showing the diaphragm in cross-section.

Referring to FIGS. 1, 2 and 15, an embodiment 20 of a pressure responsive gauge hatch structure of the present invention is shown. A gauge hatch structure 20 is adapted for use with a tank operating at superatmospheric pressures. The gauge hatch structure 20 incorporates a neck 21 that is cooperatively associated by welding or the like at its inner end with a flattened but toroidally configured base plate 22. The perimetrically outer upper edge of the base plate 22 is associated by welding or the like with an upstanding sleeve 23. The neck 21 and the sleeve 23 are cross-sectionally circular and are coaxially arranged relative to one another.

Radially outwardly extending from the circumference of the base plate 22 is a flattened support flange 24. The support flange 24 generally extends here radially outwardly from base plate 22 and the sleeve 23. Upstanding in opposed relationship to each other upon opposite sides of the support flange 24 are two pairs of upstanding ears 26 and 27, respectively (see FIG. 2). These ears 26 and 27 are conveniently attached to the support flange 24 by welding or the like. The neck 21, the base plate 22, the sleeve 23 cooperate to define a sealing liquid reservoir 28 that extends circumferentially around the neck 21. The reservoir 28 has an open end that generally radially extends adjacently to upper end portion of the neck 21.

The gauge hatch 20 has a cover 29 that incorporates among other components a pallet plate 31. Adjacent to the periphery of the bottom surface of the pallet plate 31 is an upraised circumferential channel which preferably receives therein a diaphragm 32. Particularly with close tolerances, the diaphragm can be absent. The pallet plate 31 supports and is associated with the diaphragm 32. The diaphragm 32 is adapted here to matingly seat over the outer upper end of the neck 21 so that a seating and generally sealed interrelationship is achieved between the diaphragm 32 and the outer end. Conveniently, the outer upper end of the neck 21 is machined so as to provide a uniform, circumferentially extending seating surface. Over the upper face of the pallet plate 31, a top plate 33 is provided in cover 29. The top plate 33 has a larger diameter than the pallet plate 31. The top plate 33 extends radially beyond the outer perimeter of the pallet plate 31 so as to generally overlie and shield but not seal the upper circumferentially extending edge portions of the sleeve 23.

An apron 34 circumferentially and downwardly extends from the top plate 33. The apron 34 is joined to the top plate 33 by welding or the like. The apron 34 is located in radially adjacent relationship to the neck 21. The apron 34 extends through the open end of the reservoir 28 and down into the reservoir 28, and the apron 34 has a lower end 51. Preferably, the lower end 51 of the apron 24 is in longitudinally upwardly spaced relationship relative to the inside surface of the reservoir 28 (here defined by the base plate 22). The pallet plate 31 and the top plate 33 can be considered to comprise a pallet plate subassembly 31/33. Those skilled in the art will appreciate that a reservoir 28 can be defined by various means and arrangements.

The gauge hatch structure 20 incorporates an arm 36 which, as shown, preferably radially extends here from a central outer location on cover 29 to a position between the ears 26. The inner end, the arm 36 over cover 29 is here designated as the proximal portion 37 and the outer end of the arm 36 at ears 26 is here designated as the distal portion 38. The proximal portion 37 on its bottom face is provided with a blind channel 39. The arm 36 is conveniently comprised of a molded metal to avoid heat shrinkage during molding, the arm 36 is provided with a pair of elongated depressions 35, each one in opposed relationship to the other, that extend in opposite sides of the arm 36.

Extending axially through the pallet plate subassembly 31/33 is an aperture which is provided with a nut and bolt assembly 41. The head of the bolt of the nut and bolt assembly 41 is cylindrical and adapted to be received in the blind channel 39. Perpendicularly relative to the blind channel 39, an aperture is formed in the proximal portion 37 and a mating aperture is provided in the head of the nut and bolt assembly 41. Thus, a pivot pin 42 can be extended therethrough when these apertures are aligned, thereby to hold the head of the nut and bolt assembly 41 in association with the proximal portion 37 preferably in a generally loose connection so that some play is preferably afforded between the cover 29 and the arm 36 proximal portion 37. Such play permits the cover assembly 29 to be readily self-seating relative to the upper end of the neck 21 so that the diaphragm 32 seats easily by itself on the upper end of the neck 21 under the inherent weight of the cover assembly 29.

The distal portion 38 of the arm 36 is pivotally interconnected between the ears 26 by means of a pivot pin 43 that extends through aligned channels that are defined in the ears 26 and in the distal portion 38. Conveniently and preferably, the pivot pin 43 is here headed at one end and provided with a locking cotter pin 44 at its opposite end, although other alternative means for mounting a pivot pin can be employed, if desired.

As an auxiliary means to aid in the manual opening of the cover 29 relative to the neck 21, thereby unseating the diaphragm 32 from the upper end of the neck 21, the arm 36 is provided with an upstanding serrated treadle 46 at its distal portion 38. Preferably, the treadle 46 is unitarily formed with the distal portion 37. The treadle 46 is adapted to be engaged by a foot shoe sole or heel portion (as worn by an operator). Thus, an operator can open the cover 29 by placing his foot shoe sole (not shown) on the treadle 46. When open to its maximum extent, the cover 29 and the arm 36 preferably has the general configuration illustrated in phantom in FIG. 1.

It is presently preferred to have the maximum open inclination angle for the arm 36 and cover 29 fall in the range of about 75° to about 80° for purposes of permitting inspection and easy entry to an associated tank or the like for gauging, sampling, measurement or the like, yet permitting the cover 29 to close by itself when released. Such an inclination angle is preferably achieved by inserting a stop pin 47 through aligned apertures defined in the ears 26. The location of the stop pin 47 is such that the treadle 46 or the distal portion 38 is engaged therewith when the arm 36 and cover 29 have reached a desired maximum inclination angle. Removing the foot causes the cover 29 to close in a self-seating and self-closing manner to achieve a closed configuration as illustrated in FIG. 1.

Except for the diaphragm 32, components of the gauge hatch structure 20 are preferably formed of metal (preliminarily cast and then machined to tolerances). A presently convenient metal is an aluminum alloy. The diaphragm 32 can be variously comprised, but a preferred material of construction is polytetrafluoroethylene. Diaphragm 32 preferably has a flattened disclike configuration.

The interrelationship between the neck 21 and the cover 29 is such that the cover 29 including all of its associated components can be pivoted upwardly and away from the upper end of the neck 21 when the gas (or vapor) pressure inside the neck 21 exceeds a point pressure that corresponds to the total effective weight upon the cover 29 on the neck 21. If desired, the cover assembly 29 weight can be augmented by positioning weights on the upper outside surface of the cover 29 (not shown). The tilt angle of the cover 29 when opened by gas pressure inside the neck 21, as those skilled in the art will appreciate, is roughly proportional to the pressure existing in the neck 21. Such pressure is usually not sufficient to elevate the cover 29 to its fully extended position (such as illustrated in FIG. 1 in phantom).

In use, the reservoir 28 is conveniently partially filled manually with a sealing liquid, such as a petroleum hydrocarbon or the like. The apron 34 divides the reservoir 28 into approximately two chambers as shown in FIG. 1 identified as an inner chamber 48 that is radially adjacent to circumferential outer surface portions of the neck 21, and an outer chamber 49 that is radially located between the apron 34 and the sleeve 23. The volume of the outer chamber 49 is at least equal to and preferably is greater than the volume of the inner chamber 48. The typical radial distance between the neck 21 and the apron 34 is less than or equal to (but not greater than) the typical radial distance between the apron 34 and the sleeve 23. The apron 34 has a preferably uniform lower edge or terminus 51 that is located in upwardly preferably uniformly spaced relationship to the inside upper service of the base plate 22. The level of sealing liquid 52 in the reservoir 28 is at least sufficient to immerse the lower edge 51 of the apron 34 therein, as illustrated in FIG. 1, for example.

When the cover 29 closes the mouth of neck 21 so that the pallet 32 extends over the upper end of the neck 21 and the diaphragm 32 is seated at the upper end portion of the neck 21, any small volume of fugitive vapor emissions passing from the interior of neck 21 through the seal defined by the seating area existing between the diaphragm 32 and the outer end of the neck 21 is directed into the closed chamber 48 existing above the level of the sealing liquid 52 in the inner chamber 48. In this condition, the inner chamber 48 is defined by the sealing liquid 52, the neck 21, the pallet plate subassembly 31/33, the diaphragm 32 and the apron 34. A liquid seal existing between the sealing liquid 52 and apron 51 above the lower edge 51 does not allow vapor emissions passing the seal between the diaphragm 32 and the outer end of the neck 21 to reach the atmosphere. Initially, the level of the sealing liquid 52 in the closed chamber 48 is initially the same as the level of the sealing liquid in the outer chamber 49, but, because of the above indicated chamber 48 and chamber 49 size differences, the normal volume of the sealing liquid 52 in the closed chamber 48 is usually less than the normal open volume existing over the sealing liquid 52 in the outer chamber 49.

When and if the vapor pressure in the interior of the neck 21 increases, so that the amount of vapor emissions passing through the seal between the diaphragm 32 and the outer end of the neck 21 increases, the pressure in the volume of vapor in the chamber 48 above the level of the sealing liquid 52 increases. The pressure increase resultingly displaces the liquid 52 downwards in the chamber 38 into the open and radially adjacent outer reservoir region or chamber 49, but the liquid seal existing between the lower edge 51 of the apron 34 and the liquid 52 is still maintained. The outer chamber 49 is thus defined in the reservoir 28 to be radially adjacent to the normally closed interior 48. As in the chamber 48, the open volume above the sealing liquid 52 in the chamber 49 is defined by the level of sealing liquid 52 therein. The chamber 49 is defined by the adjacent wall portions of the apron 34 and sleeve 23. The top of the outer chamber 49 is open, as indicated above, and the outer chamber 49 has a total volume that is preferably greater than the total volume of the chamber 48.

When and if the vapor pressure in the neck 21 and in the chamber 48 reaches a level where the sealing liquid 52 level in the interior chamber 48 effectively becomes less than the lower edge 51 of the apron 34, then the maximum liquid seal pressure of the gauge hatch structure 20 is exceeded and the liquid seal is opened. At this condition, vapor in the chamber 48 is vented to the atmosphere from the chamber 48 through the chamber 49 and out through the top open area of the outer chamber 49. By controlling the density of the sealing liquid and the fill level of the sealing liquid in the reservoir, the maximum liquid seal pressure for a particular sealing liquid 53 and a particular gauge hatch structure 20 can be selected or rated.

Preferably, the opening pressure (that, is the unseating pressure) of the diaphragm 32 from the upper end of neck 21 is selected so as to be at or below the maximum liquid seal pressure. Other opening pressures can be utilized if desired. For example, assume that the cover 29 either by itself or with added effective weight provides a setting corresponding to two inches of water column, and that the liquid seal existing between the liquid 52 and the apron 34 down to the lower edge 51 is set to provide a maximum liquid column equivalent to four inches water column. As the tank associated with the inside of the neck 21 increases in pressure, so that the vapor leakage pressure into the closed chamber 48 increases, the sealing liquid 52 in reservoir 28 is displaced (as described above). However, the closed chamber 48 still contains any small volume vapor leakage from the neck 21 that passes the seat at the outer end of the neck 21 with the diaphragm 32. When the pressure reaches the equivalent in the neck 21 of two inches water column, then the weighted cover 29 lifts the diaphragm 32 and the liquid seal valve opens and the desired pressure relief for the associated tank through the neck 21 is achieved. The gauge hatch structure 20 is leak free until the diaphragm 32 lifts. After pressure venting or pressure release is accomplished, the cover 29 closes and reseats itself on the neck 21 upper end.

Those skilled in the art will appreciate that various alternative arrangements for the gauge hatch structure 20 can be provided. For one example, as shown in FIG. 5, arm 36 can be rigidly fixed to the cover 29 and can be loosely associated with pivot pin 43, as illustrated in FIG. 5 so that the preferred small relative movement between the cover 29 and the ears 26 is achieved by loose journaling of the pivot pin 43.

A somewhat similar alternative arrangement to that shown in FIG. 5, is illustrated in FIG. 6 where the arm 36 is shortened and rigidly connected to a perimeter-adjacent top portion of the cover 29. Thus, in both the FIG. 5 and FIG. 6 arrangements, the preferred self-adjusting and self-seating feature for the cover 29 is achieved through the connection of the arm 36 with the ears 26.

A further alternative arrangement is illustrated in FIGS. 3 and 4. Here, in place of weights being added to the upper top surface of the apron 34, the set pressure is determined by the effective weight provided by a sheer pin 53 that is reversibly and manually insertable through respective aligned apertures in the distal portion 38 and the ears 26. In this arrangement, the cover 29 opens when a predetermined maximum pressure in the neck 21 is reached that is sufficient to overcome the effective inherent weight of the cover 29 plus the force needed to sheer the sheer pin 53.

Two further alternative arrangements are illustrated in FIG. 7 and FIG. 8, respectively. There, to avoid the need for a plurality of separately and individually made weldments such as are employed in the gauge hatch structure 20, precast bodies are employed that are arranged to reduce or eliminate weldments. Thus, in each of the arrangements of FIG. 7 and FIG. 8, the cover 29 and the arm 36 are each integrated and comprised of one molded subassembly while the reservoir 28 the neck 21, the sleeve 23, the neck support or base plate 22 (shown in FIG. 7, not shown in FIG. 8), and the mounting flange 24 (shown in FIG. 7, not shown in FIG. 8) are integrated and formed as a second unitarily molded subassembly.

Referring to FIGS. 9 and 10, there is seen another embodiment 65 of a gauge hatch structure of the invention. Components of the gauge hatch 65 that are similar to components of the gauge hatch structure 20 are similarly numbered, but with the addition of prime marks thereto for identification purposes.

In the gauge hatch structure 65, the support flange 24' and the sleeve 23' are integrally formed by casting or the like with the inside perimeter of the flange 24' being adjacent to the upper end portion of the sleeve 23' and with the circumferentially extending region of the flange 24' that is adjacent to the inside perimeter thereof being sloped downwardly.

Such an arrangement permits the lower end portion of the sleeve 23' to be restably received through and to extend about the perimeter of a vent aperture 66 in a tank 67 (shown fragmentarily) with the upper end portion of the sleeve 23' being raised relative to the vent aperture 66. Machine bolts 68 circumferentially spaced extend through the flange 24' and mount the gauge hatch 65 to the tank 67. Sealing means (not shown) can be employed to sealingly engage the flange 24' with the tank 67.

The neck 21' is supported in a concentric orientation relative to the sleeve 23' by means of a flattened washer-shaped disc (or bottom plate) 69. The disc 69 is mounted by welding or the like that extends around its outer perimeter to the lower inside end portion of the sleeve 23' and also around its inner perimeter adjacent to the lower outside end portion of the neck 21'. Thus, the desired reservoir 28' is defined by the sleeve 23', the disc 69, and the neck 21'. Reservoir 28' is conveniently manually charged with a sealing liquid 52'. Chamber size relationships are as above described in relation to gauge hatch structure 20.

The apron 34' is here conveniently formed as a circumferential flange about the periphery of a generally flat circular pallet plate 71. Plate 71 is mounted coaxially in face to face engagement with the central under surface of a cover plate 72 which radially outwardly extends beyond the plate 71 to an extent sufficient to overlie protectively but not sealingly the upper end portions of the sleeve 23'. The apron 34' extends down into the reservoir 28' so that its lower end portion is immersed in the liquid 52'.

The pallet plate 71 extends over the upper end of the neck 21'. Adjacent to the pallet plate 71 periphery and on the pallet plate 71 under surface, there is preferably received and supported a diaphragm 32' in an upwardly extending circumferential depression defined in plate 71. The pallet plate 71 is mounted coaxially in face-to-face engagement with the central undersurface of the plate 72. The plate 71, the and cover plate 72 (together with the diaphragm 32') are held in engaged relationship by the nut and bolt assembly 41', and the assembled arrangement can be considered to comprise a cover subassembly 29'. The diaphragm 32' is normally seated in a closed position upon the upper end portion of the neck 21'.

The operation and functioning of the gauge hatch 65 is similar to that described above for the gauge hatch 20.

Figure 12:
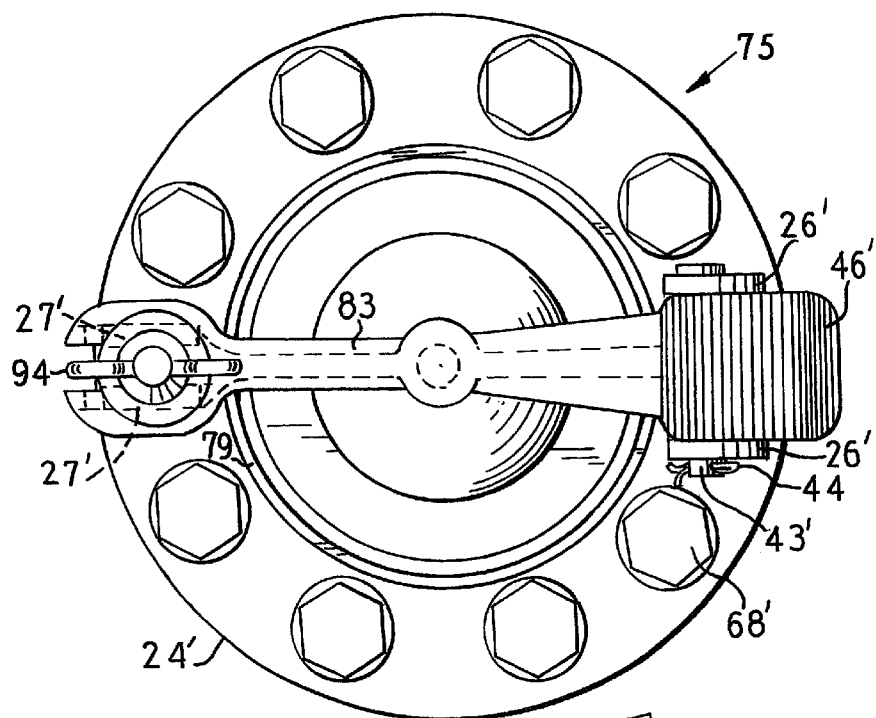
FIG. 12 is a top plan view of the FIG. 11 gauge hatch.
Figure 11:
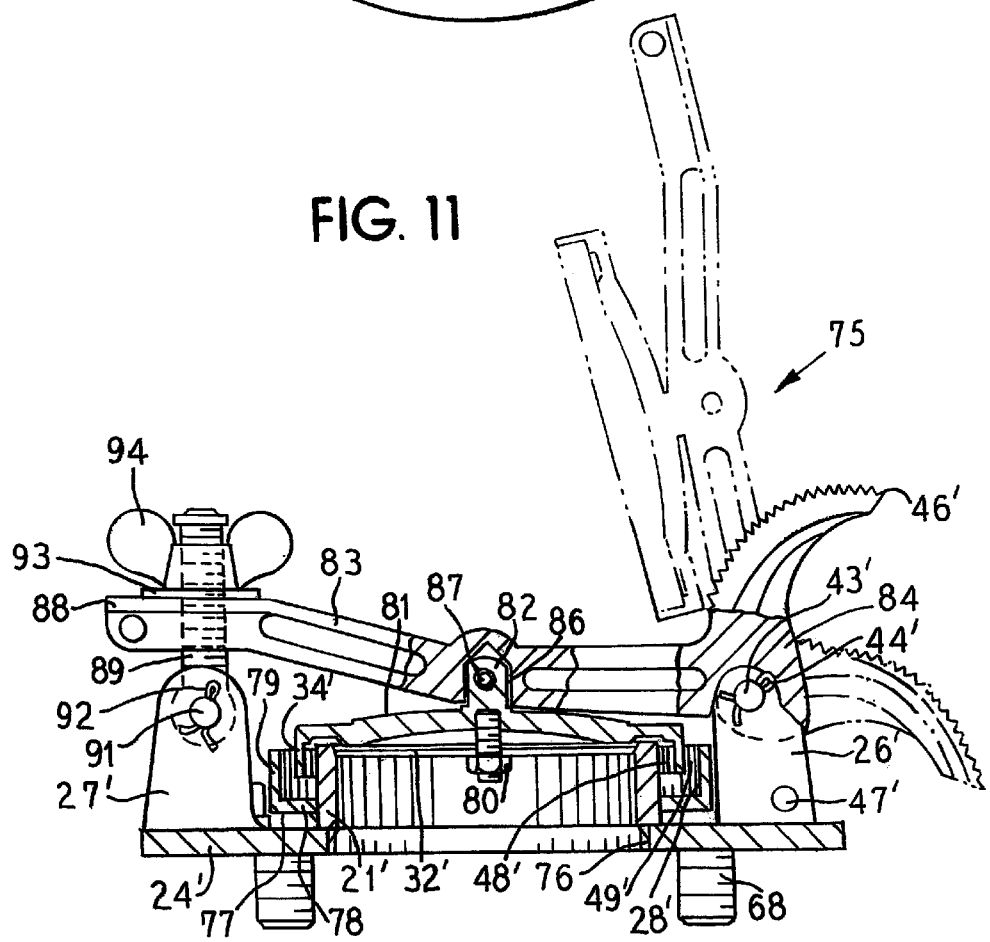
FIG. 11 is a view similar to FIG. 1, but showing an alterative embodiment of a gauge hatch structure of the invention.

Referring to FIGS. 11 and 12, there is seen another embodiment 75 of a gauge hatch structure of the invention. Components of gauge hatch 75 which correspond to components of the gauge hatch 20 are similarly numbered but with the addition of prime marks thereto for identification purposes.

In gauge hatch 75, the lower end portion of the neck 21' is joined by welding or the like to the inside perimeter of the support flange 24'. The central aperture 76 in the flange 24' is adapted to be centered over a tank vent 68 and flange 24' is bolted thereto by machine bolts (not shown) or the like.

The vent neck 21' is here associated with the circumferentially extended member 77 which is generally L-configured. The member 77 has a laterally extending base leg 78 and an upstanding leg 79. The terminal end of the base leg 78 is connected abuttingly (preferably by welding) to circumferential outside portions of the vent neck 21'. The leg 78 extends circumferentially about and in radially outwardly spaced relationship to the vent neck 21'. The upstanding leg 79 extends circumferentially and radially, and preferably in uniformly spaced relationship, about portions of the vent neck 21'. Thus, the member 77 and the vent neck 21' cooperate to define a sealing liquid holding reservoir 28' that circumferentially extends about the outside of the neck 21' and is in longitudinally preferably equally spaced but adjacent relationship to the outer end of the neck 21'. Those skilled in the art will readily appreciate that the member 77 can have various configurations and that the reservoir 28' can be defined by various means and can have various sizes.

The gauge hatch structure 75 preferably includes a circumferentially and continuously extending diaphragm 32' that is releasably seated over the outer end of the neck 21' when the gauge hatch structure 75 is in its normal diaphragm 32' closed and seated position (as shown in FIG. 11).

A hatch cover 81 is provided that supports and is associated with the diaphragm 32'. The hatch cover assembly 81 cooperates with the diaphragm 32' to provide a closure for the outer end 17 of the neck 21'. The cover 81 normally closes the neck 21' at its outer end. The cover 81 with diaphragm 32' extends diametrically across the outer end of neck 21'. Conveniently and preferably, the cover 81 is comprised of a cast metal body that is centrally slightly upwardly dome configured. The cover 81 has defined on its bottom surface in spaced but adjacent relationship to its periphery a circumferentially extending, upwardly displaced depression within which the diaphragm 32' is placed. The cover 81 has a larger diameter than the diameter of the neck 21'. Downwardly extending from the outer perimeter of the cover 81 is a circumferentially extending apron 34'. The apron 34' extends outside and preferably vertically and longitudinally to the neck 21', and preferably the apron 34' is located in radially uniformly spaced relationship between the neck 21' and the upstanding leg 79 of member 77. When the hatch cover 81 is in its normally closed position over the upper end of the neck 21', the apron 34' lower end portions are immersed in a sealing liquid that is contained within the reservoir 28'.

The hatch cover 81 has an aperture axially extending therein which is provided with a nut and bolt assembly 80 that threadably associates with a blind channel defined in a mounting post 82. The gauge hatch structure 75 incorporates an arm 83 which, as shown, preferably diametrically extends over and across the hatch cover 81. One outer end of the arm 83 is here designated as the distal portion 84. The distal portion 84 of the arm 83 is pivotally interconnected between the ears 26' by means of a pivot pin 43' that extends through aligned channels that are defined in the ears 26' and in the distal portion 84. Conveniently and preferably, the pivot pin 43' is here headed at one end and provided with a locking cotter pin 44' at its opposite end, although other alternative means for mounting a pivot pin can be employed, if desired.

As an auxiliary means to aid in the opening of the hatch cover 81 relative to the neck 21', thereby unseating the diaphragm 32' from the upper end of the neck 21', the arm 83 is provided at its distal end 84 with an upstanding serrated treadle 46'. Preferably, the treadle 46' is unitarily formed with the distal portion 84.

The central region of the arm 83 is provided on its bottom face with a blind channel 86. The mounting post 82 is adapted to the loosely received within the blind channel 86. A pivot pin 87 is adapted to be extended through aligned cross channels that are defined in each of the mounting post 82 and the mid portion of the arm 83, the channels extending generally perpendicularly to the arm 83. Thus, the pivot pin 87 is preferably adapted to hold the mounting post 82 generally in a loose connection relative to the arm 83 so that some play is afforded between the cover 81 and the arm 83 thereby to permit the cover 81 to be generally and easily self-seating relative to the upper end of neck 21'. The diaphragm 32' then seats by itself on the upper end of the neck 21' under the inherent weight of the hatch cover assembly 81 when the cover 81 is closed.

The end of the arm 83 that is opposed to the distal portion 84 is herein identified as the proximal portion 88 of arm 83. For purposes of improving the leverage action by the middle of the arm 83 against the mid portion of the cover 81 and the mounting post 82, the length of the arm 83, between the mid portion and the proximal portion 88, is inclined at its mid portion relative to the length of arm 83 between the mounting post 82 and the distal portion 84. Between the ears 27' is positioned an eyebolt 89 whose eye is pivotally mounted on a pivot pin 91 that extends through aligned respective apertures in the ears 27'. The pivot pin 91 can be structurally similar to the pivot pin 43' and the pin 91 is here illustratively associated with a cotter pin 92. The eyebolt 89 is thus pivotally movable from an upright location such as shown in FIG. 11 to a downwardly inclined location (not shown).

In its upright location, as shown in FIG. 11, the eyebolt is extendable through a vertical channel defined in the proximal portion 88 of the arm 83, the proximal portion 88 preferably being oriented so as to extend perpendicularly relative to the eyebolt 89 when the eyebolt 89 is in the connected upright position illustrated in FIG. 11. The upper outer end of the eyebolt 89 is preferably fitted with a washer 93 and is threadably associated with a wing nut 94. With the proximal portion 88 thus engaged with the eyebolt 89 and a wing bolt 94, the arm 83 is adapted to hold down the cover 81 so that cover 81 does not open, for example, in response to elevated pressures existing in the neck 21'.

When the wing nut 94 is disassociated from the eyebolt 89 (with the washer 93), the arm 83 can be pivoted upwardly about pivot 43' by, for example, the application of an operator's foot against the treadle 46', thereby opening the cover 81. When pivoted open to its maximum extend, the cover 81, like the cover 29, has the general inclined configuration shown in phantom in FIG. 11. It is presently preferred to have the maximum open inclination angle for the arm 83 fall in the range of about 75° to about 80° for purposes of permitting inspection and easy entry into an associated tank or the like and for accomplishing gauging, or for making sampling measurements, or the like. The inclination angle, as in the case of the gauge hatch structure 20, is achieved through the use of the stop pin 47' as shown in FIG. 11. Removing the foot releases the cover 81 and causes it to close in a self-seating and self-aligning manner, thereby to achieve the closed configuration illustrated in FIG. 11.

Use of the eyebolt 89, the washer 93, and the wing nut 94 in combination by an operator to bolt down the arm 83 is optional. When the combination is not used, the cover 81 opens upwardly at a set pressure, depending upon the effective weight of the cover, in a manner similar to that above described for the gauge hatch structure 20.

The operation of the gauge hatch structure 75 is similar to that of the gauge hatch structure 20.

Figure 14:
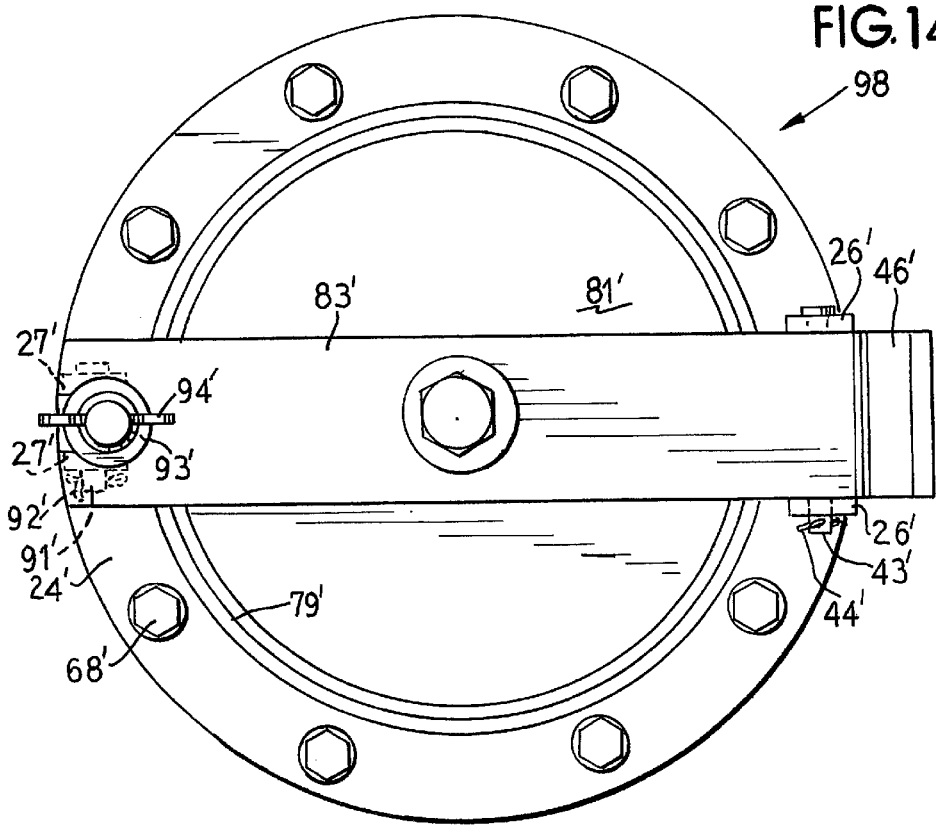
FIG. 14 is a top plan view of the FIG. 13 gauge hatch.
Figure 13:
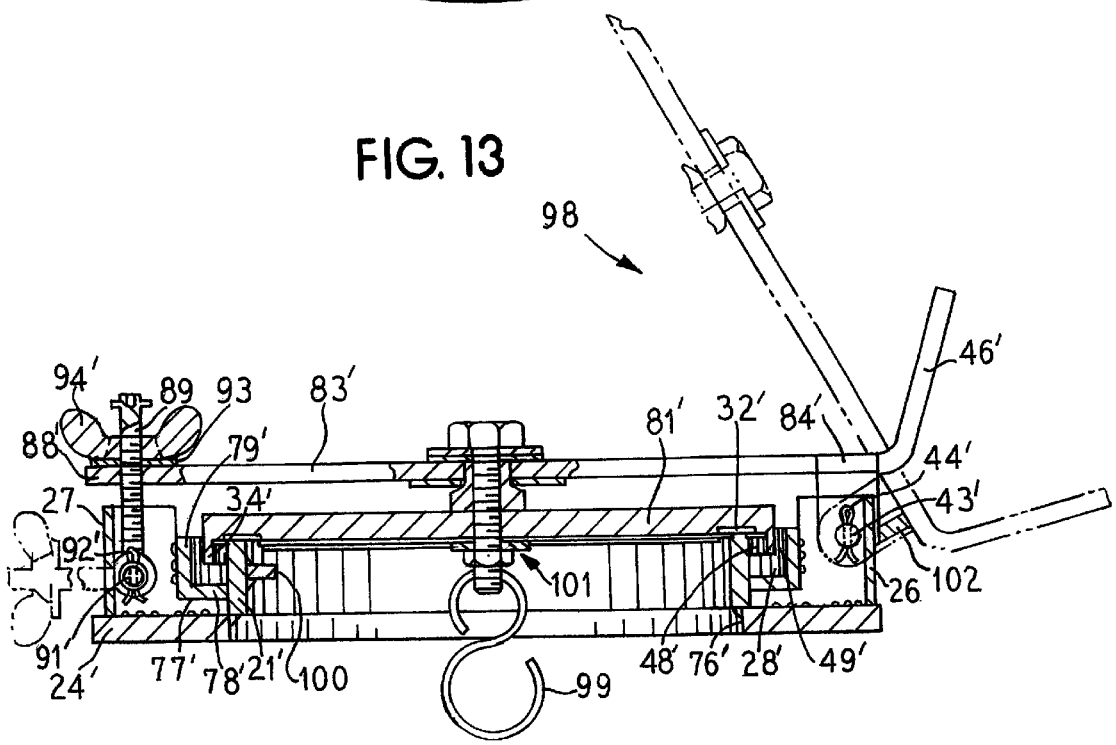
FIG. 13 is a view similar to FIG. 1, but showing an alternative embodiment of a gauge hatch structure of the invention.

Referring to FIGS. 13 and 14, there is seen another embodiment 98 of a gauge hatch structure of this invention. Components of the gauge hatch structure 98 which correspond to similar components in the gauge hatch structure 20 and in the gauge hatch structure 75 are similarly numbered, but with the addition of prime marks thereto for identification purposes.

In the gauge hatch structure 98, the arm 83' and the hatch cover 81' are fabricated from steel plate stock. The arm 83' extends straight except for an upturned treadle 46' at its distal portion 84'. The configuration of the cover 81' and arm 83' in their fully open configuration is shown in phantom fragmentarily. The arm 83' includes a stop 102 at distal portion 84 which limits the upward tilt thereof.

The gauge hatch 98 includes a hook 99 for suspending a thermometer or the like and an apertured bracket 100 for a similar function.

In the practice of this invention, it is now preferred in a cover subassembly for the diaphragm and the pallet to be so associated that a gas (such as air) provide a cushion or space between the diaphragm and adjacent portions of the pallet. Thus, a modified diaphragm and pallet structure, such as shown in Lisciani U.S. Pat. No. 3,394,732 can be utilized.

As those of ordinary skill in the art will readily appreciate from the foregoing disclosures taken with the accompanying drawings, the present invention has a number of advantages and features.

In particular, the gauge hatch assemblies of this invention prevent fugitive vapor emissions from escaping to the atmosphere prior to gauge hatch opening either at a set point pressure or manually.

A gauge hatch assembly of this invention provides two independent sealing points. The weight-loaded cover that incorporates the pallet and the diaphragm determines the set point opening of the gauge hatch. The liquid seal provides additional sealing up to its limiting pressure or vacuum set point opening.

The set point of a gauge hatch assembly of this invention can preferably be varied by changing the actual or effective weight of its cover. A present preference is to select a set point for the cover that ranges up to the maximum liquid column pressure equivalent; however, for certain applications, the liquid seal set point opening pressure can be selected to be greater than the pallet/diaphragm opening pressure set point as those skilled in the art will appreciate.

In a gauge hatch assembly of this invention, a normally closed pressure chamber above the sealing liquid is defined in the reservoir by a cylindrical apron extension that is effectively a part of the cover subassembly that incorporates pallet/diaphragm combination.

In a gauge hatch assembly of this invention, the liquid reservoir and the cylindrical apron extension form the cover subassembly and are each sized and configured so that the sealing liquid in a normally closed chamber associated with the reservoir is displaced by pressure but is contained in the reservoir until a selected set maximum liquid pressure is achieved. In effect, relative to the valve neck, a radially outer open chamber that is adjacent the normally closed chamber is defined in the reservoir by the cylindrical apron. The outer chamber preferably has a greater volume than the inner normally closed pressure chamber.

The primary gauge hatch seal that utilizes a diaphragm/pallet combination is independent of the liquid seal. If for any reason the reservoir is not charged with sealing liquid, or is inoperative, then the primary gauge hatch seal still function.

In a gauge hatch structure that is adapted for vacuum venting, the sealing liquid reservoir is preferably and conveniently isolated from the interior of the gauge hatch structure by the primary gauge hatch seal that is provided by the pallet/diaphragm/neck seal. Then, if there is a tendency to develop moisture on the inside the gauge hatch neck, the reservoir is not directly contacted with such moisture.

It will be understood that this invention can be embodied in other specific forms without departing from the spirit, scope and essential characteristics thereof. The present teachings are illustrative and not restrictive. The scope of the invention is indicated by the appended claims rather than by the preceding description.

What is claimed is:

1. A gauge hatch structure comprising in combination:
   (a) a vent neck member with opposed upper first and lower second end portions;
   (b) a wall structure that extends circumferentially around the outside of, and in radially adjacent relationship to, said vent neck member, and that defines in combination with said vent neck member a sealing liquid reservoir that extends circumferentially between said wall structure and said vent neck member, said reservoir having an upper open mouth generally adjacent to said first end portion;
   (c) mounting means for said vent neck member and said wall structure and having a support flange portion that extends radially outwardly beyond said wall structure;
   (d) a cover plate structure comprising
      (1) a pallet plate subassembly for extending across and sealingly closing said first end portion, and
      (2) an apron member that circumferentially and downwardly extends from said pallet plate subassembly, that is located in radially outside adjacent relationship to said vent neck member, and that has a lower portion that extends through said open mouth and into said reservoir; and
   (e) an arm structure having a proximal portion joined to an outside region of said cover plate structure and a distal portion pivotally joined to said mounting means outwardly adjacent said vent neck member for reversibly pivoting said cover plate structure upwardly and away from said first end portion so that said cover plate structure is inclinable relative to said first end portion.

2. The gauge hatch structure of claim 1 wherein said reservoir is charged with a sealing liquid.

3. The gauge hatch structure of claim 2 wherein said sealing liquid in said reservoir is sufficient to cover said lower portion of said apron member and achieve a liquid seal therebetween, whereby a sealed chamber is produced between respective adjacent portions of said apron, said vent neck member, said cover plate structure, and the surface of said sealing liquid when said pallet plate subassembly sealingly closes said first end portion.

4. The gauge hatch structure of claim 1 wherein said pallet plate subassembly comprises a diaphragm and said diaphragm is normally seated about said first end portion when said pallet plate subassembly sealingly closes said first end portion.

5. The gauge hatch structure of claim 1 wherein said cover plate structure has a set point opening pressure that is responsive to a pressure existing in said vent neck member and that is determined by the effective weight associated with said cover plate structure.

6. The gauge hatch structure of claim 1 wherein said arm structure includes an auxiliary treadle member for facilitating manual opening and closing of said cover plate structure.

7. The gauge hatch structure of claim 1 wherein said arm structure further includes manually connectable and disconnectable retaining means for holding said cover plate structure against said neck member independently of pressure existing inside said neck member when said pallet plate subassembly sealingly closes said first end portion.

8. The gauge hatch structure of claim 1 wherein said arm structure is loosely joined at one or more of said proximal and distal portions thereof so that said cover plate structure is self-seating relative to said first end portion.

9. The gauge hatch structure of claim 1 where, in said cover plate structure, said pallet plate subassembly comprises a top plate member overlying and associated with portions of an upper face of a pallet plate member, and said top plate member extends radially outwardly beyond and over said wall structure without closing said wall structure.

10. The gauge hatch structure of claim 1 where, in said cover plate structure, said pallet plate subassembly has a pallet plate member and a diaphragm that is associated with portions of the lower face of said pallet plate member, and said diaphragm makes a sealing engagement with said first end portion when said pallet plate member sealingly closes said first end portion.

11. The gauge hatch structure of claim 10 wherein said pallet plate member is comprised of an aluminum alloy.

12. The gauge hatch structure of claim 10 wherein said diaphragm is comprised of polytetrafluoroethylene.

13. The gauge hatch structure of claim 3 wherein said cover plate structure has a set point opening pressure that is responsive to a pressure existing in said vent neck member and that is not more than below the maximum liquid seal pressure that can exist in said closed chamber.

14. The gauge hatch structure of claim 1 wherein the interrelationship between said apron member, said wall structure, and said neck member is such that when said pallet plate subassembly sealingly closes said first end portion said apron member divides said reservoir into approximately two chambers, one of said chambers being circumferentially and radially adjacent to said neck member, the second of said chambers being generally between said apron member and said wall structure, and said second chamber has a volume that is greater than the volume of said first chamber.

15. The gauge hatch structure of claim 14 where said reservoir is charged with a sealing liquid, and the amount of sealing liquid in said reservoir is sufficient to cover said lower portion of said apron member and thereby achieve a liquid seal therebetween, whereby, when said pallet plate structure sealingly closes said first portion, said one chamber is sealed while said second chamber communicates with the atmosphere, and fugitive vapor emissions, passing from the interior of said neck member through a location where said pallet plate structure sealingly closes said first portion, enter said one sealed chamber.

* * * * *